Figure 21:
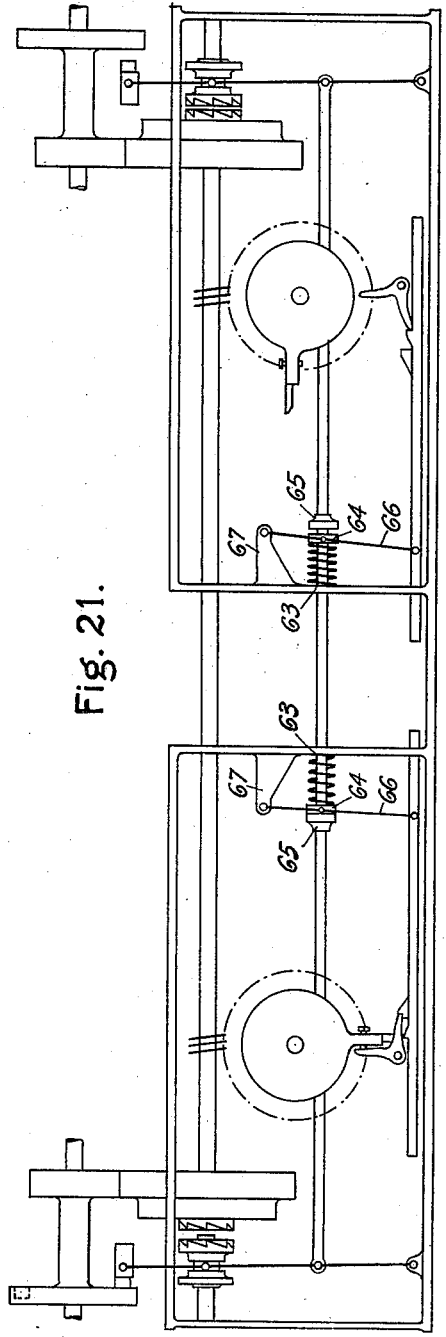

H. G. THOMSON.
WIRE NETTING MACHINE.
APPLICATION FILED FEB. 7, 1913.
1,085,510.
Patented Jan. 27, 1914.
7 SHEETS—SHEET 1.
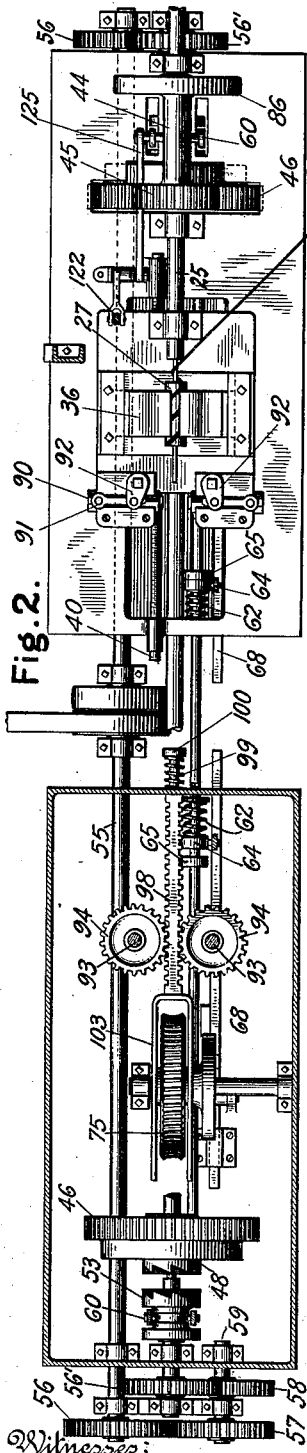
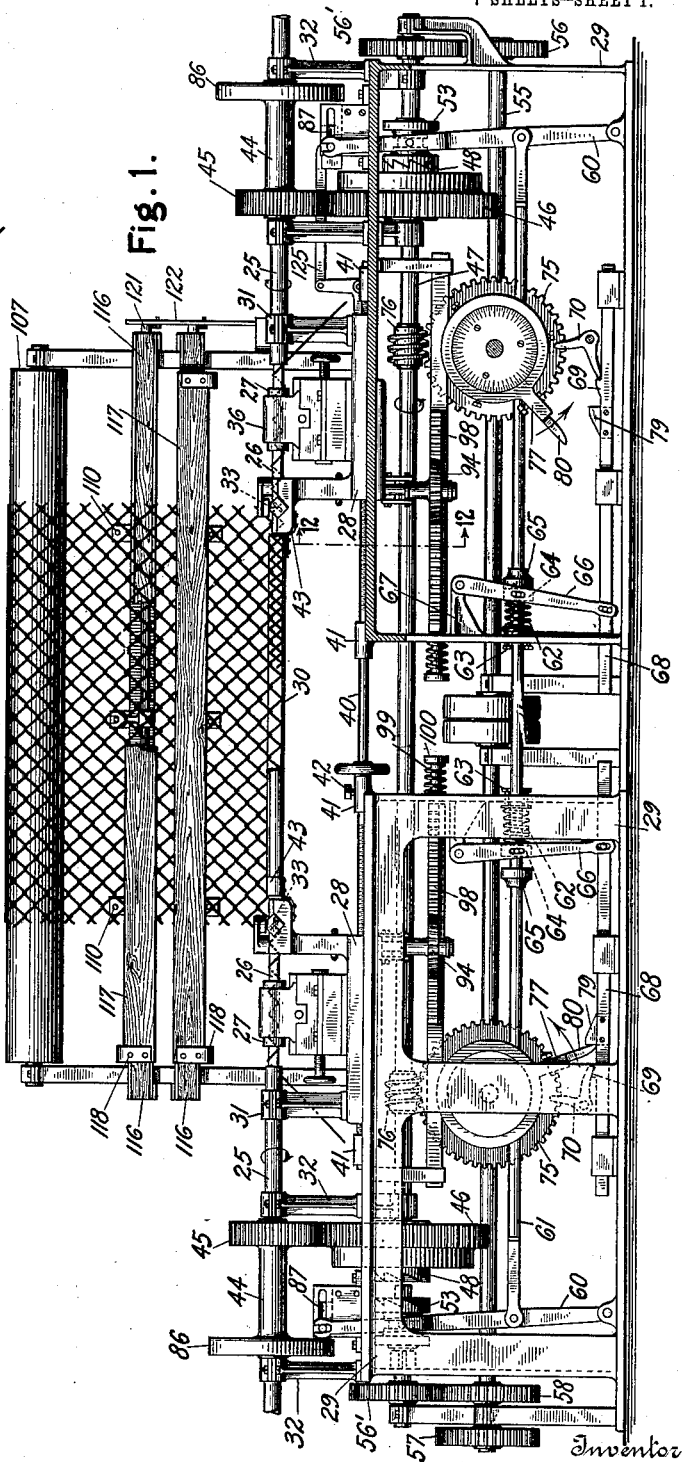
Inventor
Herbert G. Thomson
By his Attorney

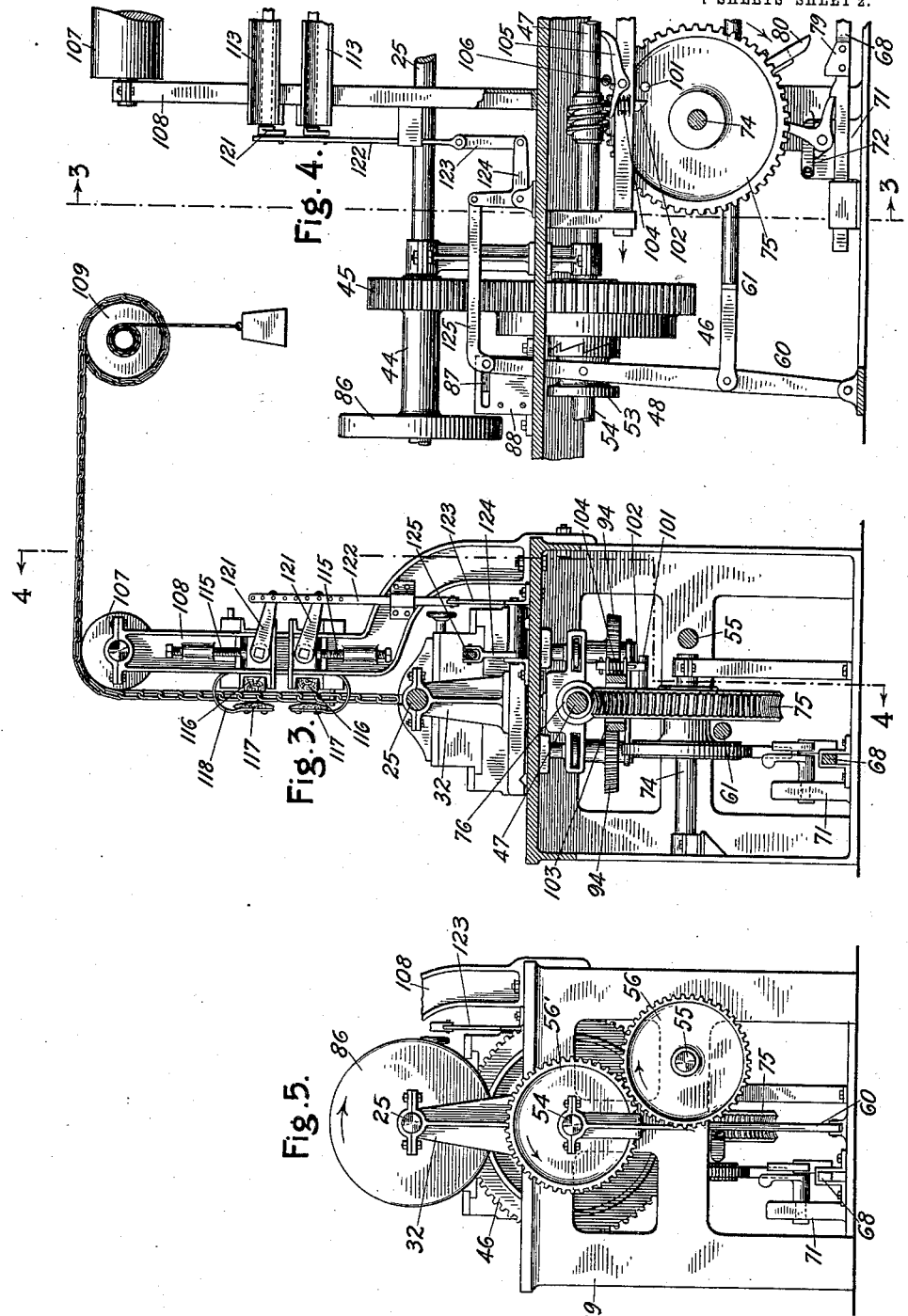

H. G. THOMSON.
WIRE NETTING MACHINE.
APPLICATION FILED FEB. 7, 1913.
1,085,510.
Patented Jan. 27, 1914.
7 SHEETS—SHEET 3.
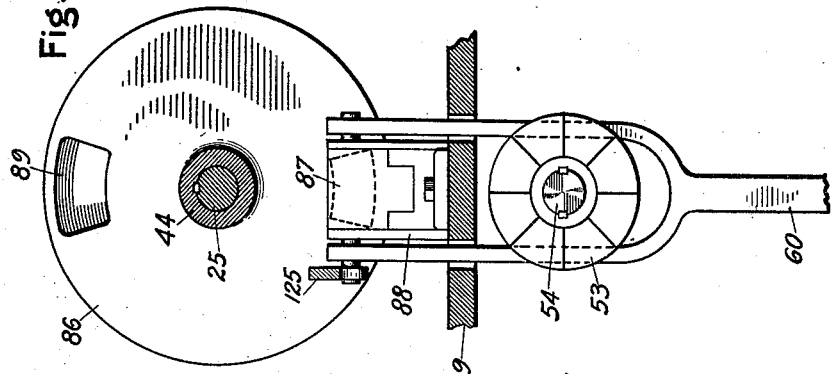
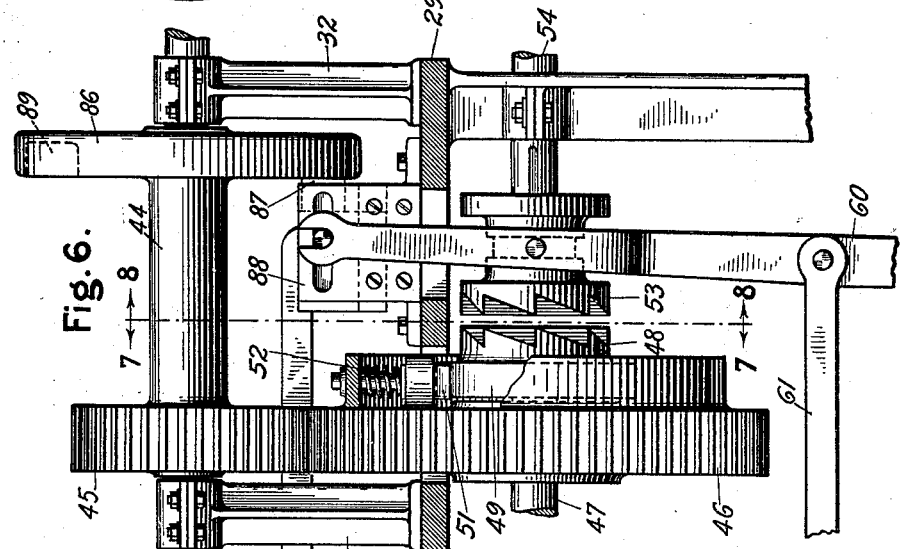
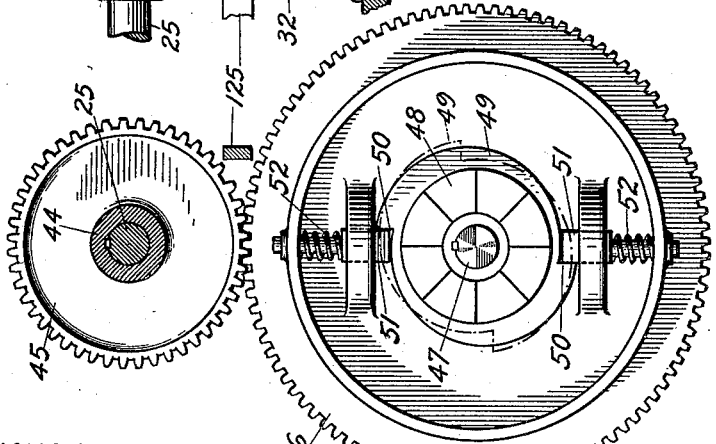
Witnesses:
M. B. Goewey
L. K. Griffin
Inventor
Herbert G. Thomson
By his Attorney
John K. Nolan H. G. THOMSON.
WIRE NETTING MACHINE.
APPLICATION FILED FEB. 7, 1913.
1,085,510.
Patented Jan. 27, 1914.
7 SHEETS—SHEET 4.
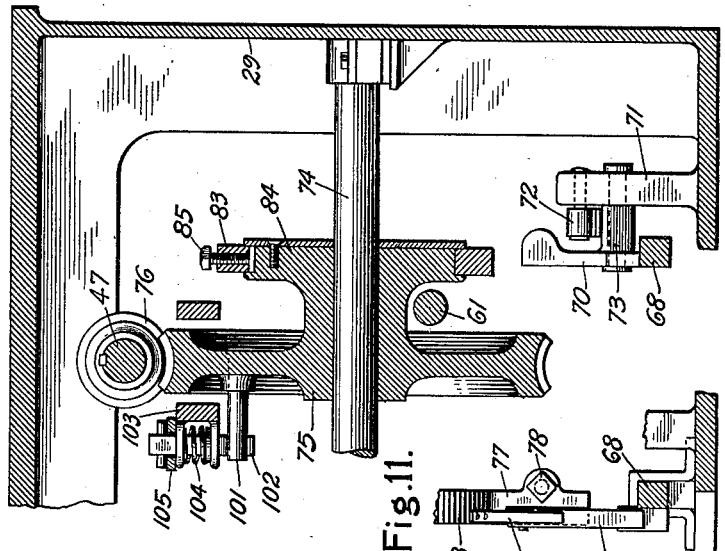
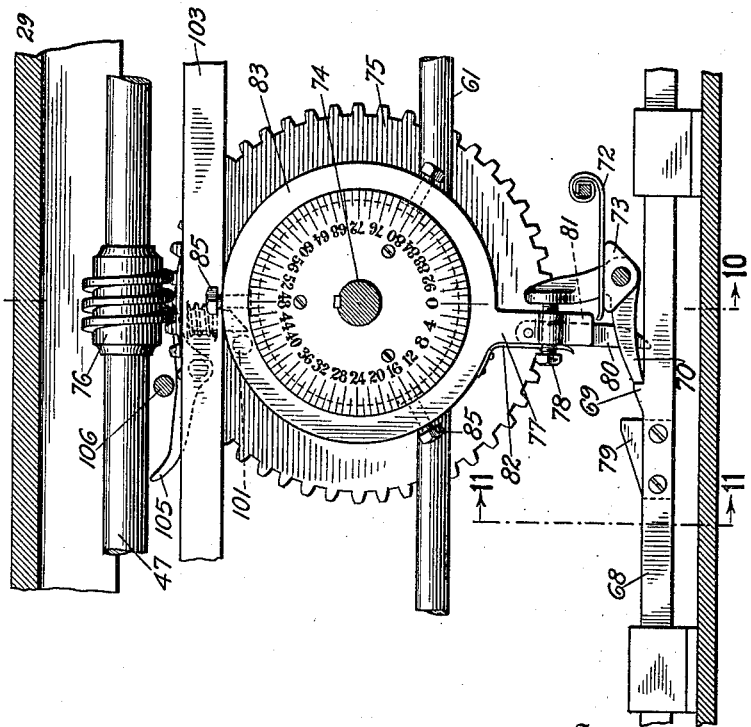
Witnesses:
M. B. Goewey
F. K. Griffin
Inventor
Herbert G. Thomson
By his Attorney
John F. Nolan

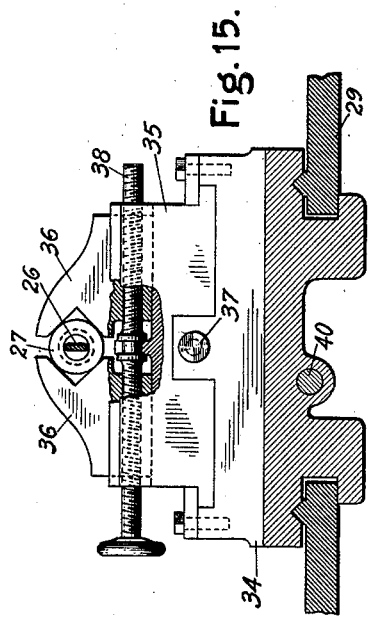
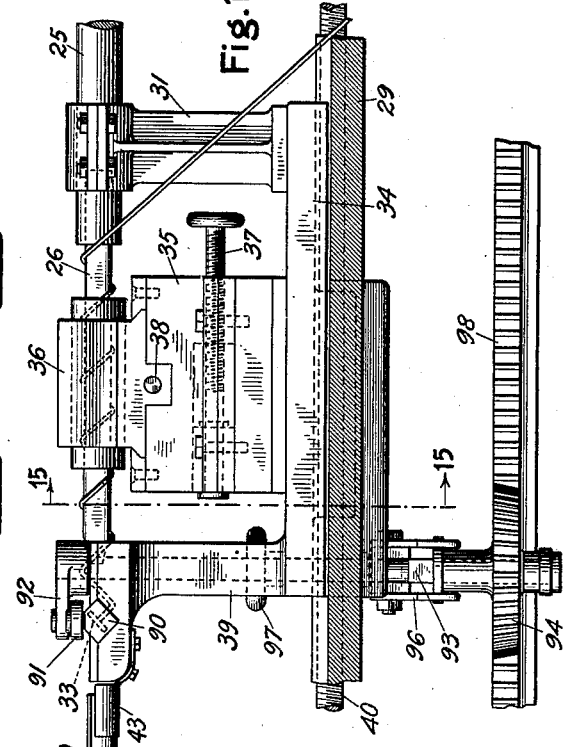
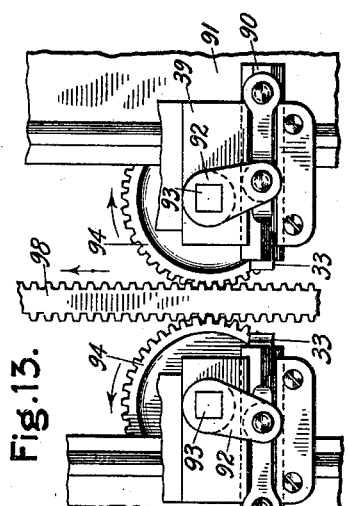
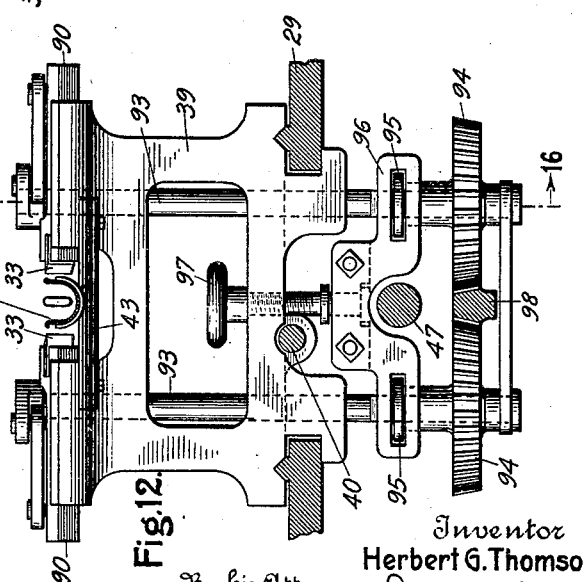

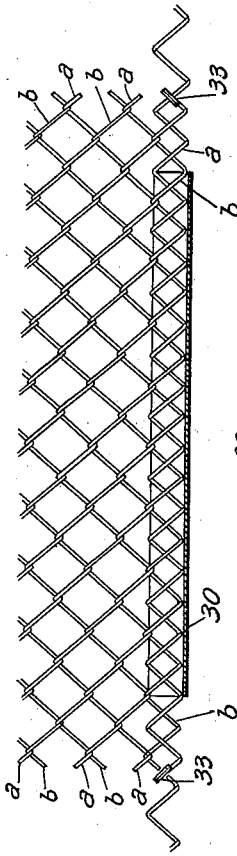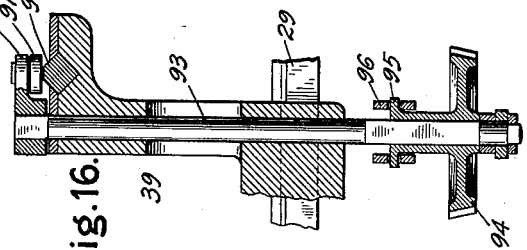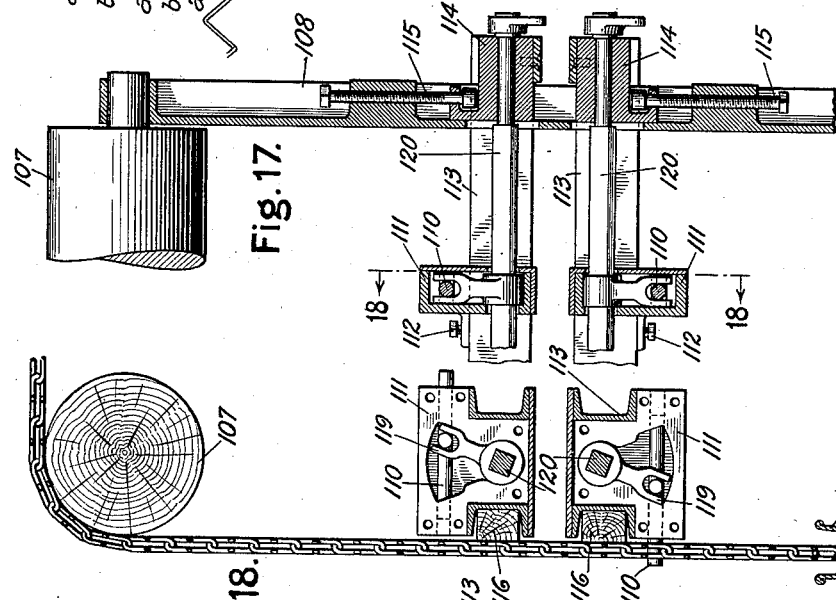

H. G. THOMSON.
WIRE NETTING MACHINE.
APPLICATION FILED FEB. 7, 1913.

1,085,510.

Patented Jan. 27, 1914.

7 SHEETS—SHEET 7.

Witnesses:
M. B. Goewey
F. R. Griffin

Inventor
Herbert G. Thomson
By his Attorney
John F. Nolan

UNITED STATES PATENT OFFICE.

HERBERT G. THOMSON, OF NEW YORK, N. Y.

WIRE-NETTING MACHINE.

1,085,510.  Specification of Letters Patent.  Patented Jan. 27, 1914.

Application filed February 7, 1913. Serial No. 746,697.

*To all whom it may concern:*

Be it known that I, HERBERT G. THOMSON, a citizen of the United States, and resident of the city of New York, in the county and State of New York, have invented certain new and useful Improvements in Wire-Netting Machines, of which the following is a specification.

This invention relates to machines for making wire-netting composed of successively interlooped strands of coiled wire; my object, primarily, being to provide a machine of simple and efficient construction and operation having large productive capacity. This end I attain by the provision of an organization of mechanism whereby the wires are coiled and fed into the netting field from opposite sides of the latter; the same permitting the operation of one or the other coiling instrumentalities irrespective of the periodical working of the cutters, and also permitting the angular cutting and vertical alinement of the ends of succeeding interlooped wires without varying the angularity of the cutters in respect to the reversely-inclined end bends of succeeding wires; without shogging the body of the fabric with relation to the cutters, and without imparting a supplemental advance movement to alternate wire sections after they have been severed.

In the preferred form of embodiment of my invention as herein illustrated, complementary coiling and cutting mechanisms are employed at each side of the space or field within which the fabric is produced; the respective coiling blades being in axial alinement with each other, and the operation of the respective mechanisms being such that one of them operates to coil a wire and feed it into and across the netting field from one side of the latter, and the other operates to coil a succeeding wire and feed it from the opposite side of the field into interloopment with the immediately preceding wire. When in each operation a proper length of wire, as prescribed by the width of the fabric, has been coiled and fed into the netting field, such length is directly severed, at the proper angle, from the body of the supply wire by suitable cutting devices. The web is intermittently taken up as it is produced, in order to present the lowermost wire-section to the path of the next succeeding wire-section; and provisions are had whereby the mechanisms can be readily adjusted to effect the production of fabrics of different widths, and of different gage of mesh.

The invention also comprises various features of construction and combinations of parts, all of which will be hereinafter particularly described and claimed.

While I have herein shown and described a good form of embodiment of my invention, it is to be understood that I do not restrict myself thereto, as the mechanisms herein selected for purpose of illustration may be considerably modified without departure from the spirit of the invention.

Figure 20:
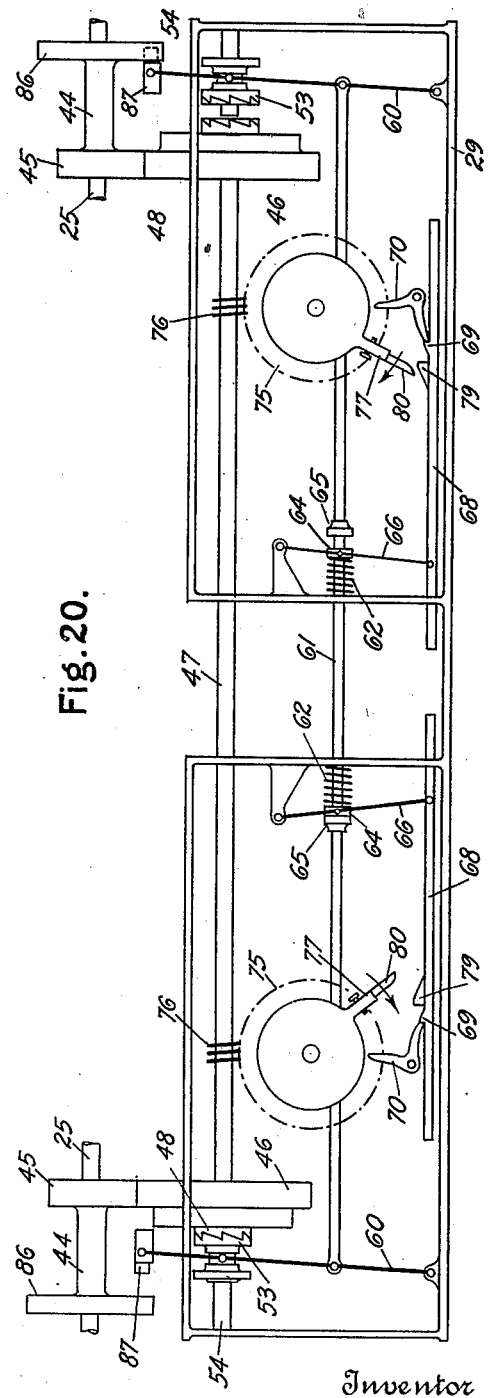

In the drawings Figure 1 is a partial side elevation of a wire-netting machine embodying my invention, the right-hand frame structure being represented in vertical section in order to expose parts otherwise concealed; the guide or support within which the wires are consecutively interlooped being partly broken away, and the upper clamping or friction bars for the netting being also partly broken away. In this view the right-hand coiling mechanism is represented as in operation forming a wire-length and interlooping it with the immediately preceding wire of the fabric; and the pivoted dog (80) of the left-hand worm wheel is represented as engaging the opposing tooth (79) of the adjacent latch-bar to shift the left-hand sliding collar and compress the corresponding spring on the coupling rod of the clutch levers. Fig. 2 is a partial plan of the machine, the left-hand side thereof being in horizontal section. Fig. 3 is a sectional end view of the apparatus, as on the line 3—3 of Fig. 4. Fig. 4 is a longitudinal vertical section of a portion of one end of the machine, as on the line 4—4 of Fig. 3. Fig. 5 is a partial right-hand end elevation of the machine. Fig. 6 is a side elevation, partly in section, of the clutch and power transmitting mechanism for one of the spindles, showing also the associated locking devices for the spindle. Fig. 7 is a vertical section as on the broken line indicated in Fig. 6, looking in the direction of the arrow 7. Fig. 8 is a similar section, looking in the direction of the arrow 8. Fig. 9 is a sectional detail showing the right-hand worm wheel, its adjustable tappet devices and adjuncts, including the latch-dog and the latch-bar controlled thereby. Fig. 10 is a transverse vertical section, as on the line 10—10 of Fig. 9. Fig. 11 is a sectional detail of the tappet arm and adjuncts, as on the line 11—11 of Fig. 9. Fig. 12 is a partial vertical section through the top of one of the frame structures adjacent to the cutter mechanism, as on the line 12—12 of Fig. 1. Fig. 13 is a partial plan of Fig. 12. Fig. 14 is a side elevation of one of the head-stocks, showing the die, the cutter devices, and the coiling blade of the spindle. In this view the wire is illustrated as coiled upon the blade, and the angular relation of the cutters to the severed bend of the wire is indicated. Fig. 15 is a transverse section, as on the line 15—15 of Fig. 14, a portion of the clamping jaws and their support being partly broken away to show the mounting of the double adjusting screw. Fig. 16 is a vertical section through one end of the head-stock and adjacent parts, as on the line 16—16 of Fig. 12. Fig. 17 is a vertical section through one of the frame standards, showing the adjacent portions of the escapement devices for the netting and the adjusting means for said devices. Fig. 18 is a vertical section, as on the line 18—18 of Fig. 17, showing the wire-netting, the relation of the escapement pins thereto, and the guide within which the interloopment of the wires is effected. Fig. 19 is a diagram illustrating the lower portion of the fabric and the relative position of the two lowermost wires preparatory to lifting the upper wire of the pair from the guide or support. In this view the angular positions of the cutters in respect to the opposing bends or inclines of the wires to be severed, are clearly indicated. Fig. 20 is a diagram illustrating the relative positions of the clutches and their controlling devices while the left-hand spindle is in operation. Fig. 21 is a similar diagram illustrating the relative positions of the parts during the change of operation from the left-hand to the right-hand coiling spindle; the two clutches being indicated in neutral or inactive position preparatory to the bringing into action of the right-hand clutch.

25, 25 represent two coiling spindles arranged in spaced relation to and in axial alinement with each other, and adapted to operate at the respective sides of the space within which the interloopment of the consecutive wire sections is effected. Each of the spindles terminates at its inner end in a flat coiling blade 26, which extends into the spirally grooved bore of a die 27 supported on a head-stock 28 on an underlying frame structure 29; the construction being such that wire delivered at a proper angle to the coiling blade from a suitably-disposed reel (not shown) will, by rotation of the blade, be taken up and bent into flattened coil-form so as to enter the internal groove of the die and be advanced thereby rotatably upon and along a guide or support 30 which extends across the netting field. The spindle has a bearing in a post 31 on the head-stock, and it is also mounted for rotation, with capacity for longitudinal movement, in bearings in posts 32 rising from the frame structure.

Two sets of wire cutters 33 are arranged on the respective head-stocks, in advance of the respective dies 27, and are adapted to be periodically actuated, as hereinafter described, to sever the successive wires at the proper angles, and at the vertical edges of the fabric, after such wires have been coiled and fully fed into and across the netting field. These cutters are arranged in reversely-inclined position relatively to each other and at right angles to the opposing bends or inclines of the wires to be severed, so that the requisite angular cutting and vertical alinement of succeeding interlooped wires shall be directly accomplished. (See Figs. 1, 14 and 19).

It is to be here noted that unless otherwise indicated the coiling and cutting mechanisms on one side are identical in construction and operation with the corresponding mechanisms on the other side of the machine, saving that they are reversed,—one being "right-handed" and the other "left-handed" as viewed in Fig. 1 of the drawings. For purposes of identification whenever necessary these mechanisms and their appurtenances are herein referred to as "right-hand" and "left-hand".

Each of the head stocks 28 in the form herein illustrated includes a base 34 which is slidingly fitted to the sides of a longitudinal guide-slot in the frame structure; a section 35 which is independently adjustable on and longitudinally of the base, and a pair of jaw members 36 which are mounted on said section and are adapted to clamp the die 27 on the head-stock axially of the coiling spindle. The section 35 is shaped to receive and is fitted to suitable guides on the base, and it is independently adjustable thereon by means of a screw-shaft 37 which is rotatably mounted in the base and engaged with an internally-threaded portion of the adjustable section.

The jaw members 36 are provided on their under sides with guide portions which are slidingly fitted to a transverse guide way in the section 35, and the latter has rotatably mounted therein a screw-shaft 38 having oppositely-pitched threaded portions which engage correspondingly threaded portions of the respective members, whereby proper rotation of the shaft will open or close the two members. (See Fig. 15). Thus a die, of any desired gage, may be readily applied to or removed from the head-stock as particular requirements may demand.

The base of the head stock is provided at its inner end with a standard 39 which supports in a suitable plane in advance of the coiling die, the cutting devices and their co-related parts, as will be hereinafter described. Nice adjustment of the die in respect to the cutters can be effected by manipulating the screw shaft 37. (Fig. 14).

The bases of the two head-stocks are operatively connected to the reversely-threaded end portions of a screw-shaft 40 which is mounted to rotate in brackets 41 rising from the respective frames, whereby when the shaft is properly turned the two head-stocks and their appurtenances, including the cutters and the coiling spindle, are bodily adjusted toward or from each other in order to prescribe the distance between the two sets of cutters, and thus determine the length of the wire sections, that is, the width of the fabric. Means, such as a set-screw 42 in one of the brackets, may be employed to lock the screw-shaft 40 when the desired adjustment of the head-stocks has been accomplished. (See Fig. 1).

The wire guide or support 30 preferably comprises a trough-like section which is detachably supported in brackets 43 on the standards 39 of the respective head-stocks, whereby sections of various lengths corresponding with the predetermined width of the netting field, may be readily applied to the machine. (See Figs. 1, 12 and 14).

On each of the coiling spindles is splined, in the space between the standards, a sleeve 44 bearing a pinion 45, which, while effecting rotation of the spindle, yet permits independent axial adjustment of the latter toward and from the netting field, as above mentioned. The pinion 45 meshes with a spur wheel 46 which is loosely mounted on a shaft 47 extending longitudinally of the machine, such shaft being of sufficient length to carry the respective spur wheels 46 of the right and left hand mechanisms. On each end of the shaft 47, adjacent the spur wheel 46, is keyed or otherwise fixed a clutch member 48 bearing a cam or ratchet wheel 49 having two substantially-opposite toothed or shouldered portions 50 which, when the clutch member is rotated in one direction, impinge against a pair of radial dogs 51 on the side of the adjacent spur wheel and correspondingly rotate the latter. These dogs are radially movable in guide pieces on the spur wheel, and are held yieldingly in contact with the periphery of the cam wheel 49 by means of suitably-disposed springs 52, whereby when the proximate clutch member is turned in a reverse direction (as will be hereinafter explained) the spur wheel is unaffected thereby. (See Figs. 6 and 7). The complementary member 53 of each of the clutches is slidingly splined on a shaft 54 at the end of the frame, and this shaft is geared with and driven from a common drive shaft 55 having its bearings in suitably-disposed boxes in the frame structures.

The gearing between the drive shaft and the two clutch shafts 54 is such that the latter are continuously rotated in opposite directions to each other. As herein illustrated, the drive shaft is connected with the right-hand clutch shaft 54 by two meshing gear wheels 56, 56' respectively, and with the left-hand clutch shaft 54 by a train of gears, wherein those 56, 56' on the drive and clutch shafts mesh respectively with two gear wheels 57, 58 on a jack shaft 59. (See Figs. 1, 2 and 5). Thus it will be seen that if either of the continuously-rotating clutch members be moved into engagement with its complementary member, the motion will be transmitted through the described gearing to the associated coiling spindle, and that by alternate actuation of the two spindles the coiling of the wires and the feeding of them in opposite directions to each other into and across the netting field, will be accomplished.

In the present instance, the mechanism for effecting and controlling the periodical operation of the two clutch devices is of the following description: The sliding clutch members 53 are rotatably connected to the yoke extensions of two upright levers 60 which are pivoted on the bed-plate. These levers are coupled by a rod 61 so as to be movable as a unit to the right or left and thus throw the two clutches alternately into or out of action at the proper intervals of time. Suitably disposed on the rod 61 are two springs 62, 62 one within each frame structure. Each of these springs is interposed between two stops, one of which is stationary and may be afforded by the adjacent standard of the frame structure, or by a bushing 63 (Fig. 1) on said standard, and the other of which stops is a sliding member which may comprise a loose collar 64 on the rod. On this rod, adjacent each of the slide collars, is formed or secured a collar 65 which affords an abutment for the sliding collar in opposition to the force of the contiguous spring. The relation of the parts is such that if one of the sliding collars, say the right-hand collar, be forced toward the opposing stop 63 in a manner to compress the interposed spring and be there temporarily locked, the left-hand spring will tend to force its sliding collar, (if the latter be unrestrained) against the opposing fixed collar 65 on the rod and thus bodily shift the latter endwise to the left until the right-hand collar 65 abuts against the adjacent sliding collar, thus shifting the right-hand clutch into and the left-hand clutch out of action. If, subsequently, the left-hand collar be forced toward the opposing stop 63 a reverse endwise shifting of the rod, under corresponding conditions, will be effected, thus throwing the left-hand clutch into and the right-hand clutch out of action.

Each of the collars 64 is pivotally connected to a depending rock-arm 66 which is pivoted to a bracket 67 on the adjacent frame structure, the lower end of the arm being connected to a sliding latch-arm 68 which is supported and guided in brackets on the bed-plate. This bar is provided on its upper side with a suitably-located tooth 69 with and from which is adapted to be engaged and disengaged at predetermined intervals a pivoted dog 70, the relation of the parts to each other being such that when the pawl is engaged with the tooth 69 the latch-bar and its rock-arm are locked against movement toward the outer end of the frame structure in which such latch-bar is mounted. The dog is pivoted to a bracket 71 (Fig. 10) on the bed-plate, and is held normally in active position by means of a suitably-disposed spring 72 which presses upon a lateral bearing piece 73 on the dog. On a transverse shaft 74, directly above each of the dogs, is mounted to rotate a worm wheel 75 with which meshes a worm 76 on the shaft 47 which carries the gear wheels 46, whereby during the rotation of said shaft 47, irrespective of the particular end clutch which may be in action, the two worm wheels are simultaneously driven. (See Figs. 1, 20 and 21).

It is to be noted that when the right-hand clutch is in action the worm wheels are rotating in the direction indicated by the arrows in Fig. 1, and that when the left-hand clutch is in action the two wheels are rotating in a reverse direction to that indicated by such arrows.

Each of the worm wheels bears a radially-projecting arm 77 carrying, preferably, a tappet screw 78 (Figs. 9 and 11) which is so located that at a certain period of its rotation the screw impinges against the opposing arm of the dog 70 and disengages the dog from the tooth 69 of the latch bar, thus freeing the latter and permitting the endwise shifting of the rod and its connected arm and sliding collar by the expansive action of the compressed spring on the latter.

On each of the latch bars 68 is formed or secured adjacent to the tooth 69 a laterally-disposed tooth 79 which is located in the path of a pivoted dog 80 on the arm 77. This dog is held normally in a radial position against an opposing wall or shoulder 81 on the arm 77 by means of a suitably-disposed spring 82, whereby the dog 80 will swing idly upon and past the tooth 79 while the arm 77 is advancing to engage and trip by its screw 78 the dog 70, and will be backed by the opposing wall or shoulder when the dog 80, in the reverse movement of the wheel, encounters said tooth 79. (See Fig. 9). Thus the dog 80 in the latter case will shift the latch-bar, its rock-arm and sliding sleeve, until said dog escapes the tooth 79 and the adjacent tooth 69 is moved into position for reëngagement by the dog 70. Consequently the spring will be compressed by the movement of the sliding sleeve, and the latter will be locked in position.

The operations of periodically moving and locking the sliding collars 64 by actuation of the respective latch-bars, are repeated in alternation until the desired length of netted fabric has been produced; the successive wire lengths being periodically severed from their respective supply wires by actuation of the cutting devices as hereinafter described.

In order that the timing of the clutch-shafts can be adjusted to the width of the fabric, as defined by the number and size of the coils in the space between the two sets of cutters, provision is had whereby the operative periods of the right and left-hand latch-tripping devices may be nicely predetermined. Accordingly one of the arms 77 and its associated dog 80 is adjustable about the axis of its worm wheel (in the present instance, the right-hand wheel), said arm being formed on a ring 83 which is rotatably seated on an enlarged hub 84 of the wheel and is held in place thereon by suitably-disposed set-screws 85. (Fig. 10). The face of this hub is provided with radial graduations which indicate the number of coils or bends to be given to the wire during a prescribed range of travel of the tappet, and the ring is provided with an index mark adjacent the graduations, whereby the ring may be turned on its seat and set at any predetermined point. (See Fig. 9).

As a means to check the rotation of each of the coiling spindles after the requisite length of wire has been coiled and fed thereby into the netting field, a suitable brake and lock for the spindle is provided. Accordingly a disk 86 is formed on or secured to each of the sleeves 44, and the upper bifurcated extension of the adjacent clutch lever 60 is pivotally connected to a block 87 which is reciprocative toward and from the opposing side of the disk. This block is slidingly fitted to a guide bracket 88 on the frame structure, adjacent the disk, so as to be pressed yieldingly against the opposing side of the disk when the reciprocative clutch is moved out of action and thus serve as a brake to slow down or retard such disk and its connections. At a suitable point in this side of the disk is a recess 89 with which the block registers, and thus locks the disk and spindle, when the precise length of coiled wire has been produced and delivered to the netting field.

It is to be noted that by adjusting the tappet-arm screw 78 above referred to, the precise point of its impact with the opposing trip dog 70 can be nicely predetermined in order to define the extent of rotation of the disk 86 before the block 87, which has been brought in contact with the disk, enters the recess and locks the disk and its adjuncts.

The coöperative relation of the locking devices to the respective coiling spindles and their actuating mechanisms is such that during the netting operation the spindles are locked and unlocked periodically in alternate succession, that is, the spindles are locked during their idle periods and unlocked during their active periods; these relative positions of the locking devices being controlled through the clutch shifting mechanism. When the mechanism is shifted to throw, say, the right-hand clutch into and the left-hand clutch out of action, that block 87 under the control of the left-hand clutch arm impinges yieldingly against the face of the opposing disk at a point somewhat in advance of the recess 89 of the latter, thus temporarily holding both clutches in a neutral or inactive position. (See Fig. 21.) In this operation the block under the control of the right-hand clutch arm is retracted from the recess of its opposing disk. The left-hand disk, owing to the momentum of its associated rotary parts, continues to turn, but when it has made, for example, approximately a half-turn, the contiguous block registers with the recess and thus positively locks the left-hand spindle against rotation. An additional endwise movement of the clutches (to the left) takes place when the left-hand block enters the opposing recess, thereby throwing the right-hand clutch into action, as seen in Fig. 1. Thus the left-hand spindle is locked, its clutch is out of action; the right-hand spindle is unlocked, and its clutch is in action.

When the right-hand spindle has effected the coiling and advancement of the wire, the clutch mechanism is shifted to throw the left-hand clutch into and the right-hand clutch out of action, and the respective locking devices are accordingly operated in proper sequence. (See Fig. 20.)

As indicated by the dotted lines in Fig. 7 the shoulders of the cam-flange of the left-hand clutch are disposed at right-angles to those of the flange of the right-hand clutch in order that the former shoulders shall be positioned to engage the dogs of the left-hand gear wheel and effect the timely rotation of the left-hand spindle. The latter thereupon effects the coiling of the wire and its advancement into and along the guide and into interloopment with the immediately preceding wire which is supported on the guide. (See Fig. 19.)

The cutting devices hereinbefore referred to are constructed and arranged to sever the successive coiled wires in alternation, the severance of one wire being effected after the other or succeeding wire has been partially interlooped therewith. Each set of cutting devices comprises a pair of horizontally reciprocating bits 33 between which the wire is fed and thereby severed in a plane at right angles to the interposed inclined limb or bend of the wire. These bits are secured to the inner ends of a pair of slide bars 90 which are fitted to guides in the standard 39 of the head-stock hereinbefore referred to. Each of the bars 90 is flexibly connected by means of a link 91 with a crank-arm 92 on the upper end of a vertical shaft 93 which is rotatably mounted in the standard, whereby when the shaft is rotated the bar and its cutter are reciprocated toward and from the axis of the coiled wire. Slidingly fitted on the lower portions of the two shafts 93 are two gear wheels 94 the hubs of which are provided with flanges 95 which extend into the slotted side members of a vertically-movable head 96. The body of this head is connected with a vertical adjusting screw 97 fitted to the standard 39 of the head stock, whereby the head 96 and, perforce, the gear wheels 94 can be raised or lowered as a unit. The lower portions of the shafts 93 and the bores of the gear hubs are, in the present instance, square in cross-section to permit their relative vertical movement. (See Figs. 12, 13 and 16.)

When the gear wheels 94 are in their down position they mesh with the respective toothed sides of a double rack-bar 98 which extends longitudinally of the frame structure, whereby when the rack-bar is reciprocated the wheels are actuated to effect, through the intervening connections, the reciprocation of the cutter bars. When the wheels are raised they are disengaged from the teeth of the rack-bar in order to permit the requisite adjustment of the head-stocks, and the parts supported thereby, toward or from each other by actuation of the screw-shaft 40, as above described.

Each rack-bar is normally maintained in retracted position with the cutters open, by means of a suitably-disposed spring 99, on an end extension of the bar, said spring bearing against the frame structure and a collar or head 100 on the extension. (See Figs. 1 and 2). The forward or active movement of the rack-bar, to close the cutters, is effected by a laterally projecting stop 101 on the adjacent worm wheel coacting with a projection 102 on a bifurcated extension 103 of the rack-bar embracing the worm wheel; said stop and projection being so located relatively to each other that during the return rotation of the worm wheel following the unclutching and consequent stopping of the adjacent coiling mechanism, the stop encounters the projection and advances the rack-bar. When in such rotation of the worm wheel, the projection 102 on the rack-bar is withdrawn from the path of the stop 101, the spring 99 retracts the rack-bar to its normal position and thus effects the opening of the cutters as above-described. This projection 102 preferably comprises a stud slidingly mounted in a pair of lateral lugs on the bifurcated extension of the rack-bar, and maintained yieldingly depressed by the action of a suitably-disposed spring 104. Its upper end is pivotally connected to one arm of a latch-lever 105 which is pivoted to the adjacent side of the bar extension. The other arm of this lever is deflected upward, and a fixed stop 106 is arranged in the path traveled by the arm as the rack-arm is being impelled by the action of the rotating stop 101 on the yielding projection. Thus the upwardly-extending lever arm is depressed by the opposing fixed-stop 106 in a manner to raise the projection 102 against the force of its spring, and permit the rotating stop 101 to clear the projection. Thereupon the rack-bar is returned to its normal position by the spring 99, and likewise the projection and its lever 105 are returned to their original position by the action of the spring 104. The lower extremity of the spring-pressed projection 102 is beveled to present a cam-surface to the stop during the reverse rotation of the worm wheel. (See Figs. 3, 4 and 10).

The wire-netting passes as usual to and over a beam or roller 107 supported by uprights 108 rising from the respective frame structures and is connected to and held under tension by a suitable take-up roller 109 as usual. (See Fig. 3). Escapement means for the web, to permit the intermittent action of the take-up thereon, are provided. The means herein illustrated comprises two horizontal rows of pins 110 arranged one above the other and movable alternately into engagement with the web; that is, when one row is engaged with the web the other is disengaged therefrom, and the converse. (See Figs. 3, 4, 17 and 18). In the present instance there are three pins in each row, the same being horizontally guided in bracket-cases 111 which are secured by set-screws 112 to parallel rails 113 supported by and between end members 114 on the uprights 108. The pins can be readily adjusted transversely of the machine by proper disposition of the bracket cases on the rails 113. The adjacent end members on each upright are adjustable vertically toward and from each other by means of oppositely-disposed set-screws 115, 115 fitted to bearings on the side of the upright, and thus the parallel rails and their respective rows of pins, &c., can be correspondingly adjusted as the width of the meshes of the wire web may require. The front rails bear face bars 116, preferably of wood, which afford a backing against which the web is pressed by means of a pair of friction-bars 117 which are held yieldingly against the outer face of the web by bow springs 118 secured to and extending from the front rails, as shown in Figs. 1 and 3. The relation of the parts just described is such that the pressure is exerted upon the web in a plane between the two rows of pins in a manner to maintain the web in the operative path of the pins. The upper and lower pins are operatively connected by arms 119, 119 respectively to two parallel rock-shafts 120, 120 which have their bearings in the end members 114. The arms 119 are confined within the bracket cases so as to be adjustable thereby transversely of the machine. The shafts 120 are provided at one end with rearwardly extending arms 121 which are coupled by means of a vertically movable bar 122, the connection being an adjustable one (conveniently afforded by perforations in the bar) in order to compensate for the adjustment of the pins and their supporting parts. The lower end of this bar 122 is connected by means of a link 123 with one arm of a bell-crank-lever 124, the other arm of which is connected by means of a link 125 with the upper end of one of the clutch levers 60—in the present instance the right-hand clutch lever. By this construction it will be seen that when the right-hand clutch is in action, the bar will be down and accordingly the upper row of pins will be retracted from and the lower row projected into the opposing meshes of the web; the latter pins thus preventing the upward movement of the fabric. When, however, the right-hand clutch is thrown out of action, the position of the two rows of pins will be reversed, that is, the lower row will be retracted and the upper row projected into the opposing meshes, the latter row of pins permitting the upward movement of the web a distance equal to half the width of a mesh before they are encountered by the opposing coils of the wire. Thus in each movement of the clutches to the right or left, to throw one coiling mechanism into and the other out of operation, the web is uniformly raised the requisite distance.

The general operation of the machine thus described is as follows: Preliminary to the operation, the parts are so set that one of the clutches is in and the other out of action. Let it be presupposed that the right-hand clutch is in and the left-hand clutch is out. The right-hand latch-bar 68 is engaged by its dog 70, thus holding the right-hand spring 62 under compression. The left-hand latch bar 68 is free of its dog 70 and the proximate spring 62 is pressing the opposing sliding collar 64 against the contiguous shoulder 65 of the coupling rod 61 in a manner to maintain the clutches in the relative positions mentioned. The disk 86 of the left-hand spindle is locked and that of the right-hand spindle is unlocked by the relative positions of the respective blocks 87 due to the angularity of the clutch levers 60. The relation of the tappet arms 77 to their respective latch-dogs 70 is such that the left-hand arm is disposed vertically, or substantially so, just in advance of its dog 70 and the right-hand arm is adjusted a prescribed distance rearwardly of its dog 70, that is, the right-hand dog is moved clock-wise until the index mark registers with a graduation indicating the number of coils to be formed in a given length of wire. The parts just mentioned thus occupy the relative positions indicated in Fig. 21, saving that the clutch rod 61 is advanced slightly more to the left, and the right-hand clutch is in and the left-hand clutch out of action. Wires are drawn from suitably-located reels and engaged under tension with the respective coiling blades and dies. Power being applied to the driving shaft 55 the two clutch shafts 54 are rotated through the described gearing in opposite directions to each other; the worm-shaft 47 being driven by and in the same direction as the active right-hand clutch. The teeth of the cam-flange 49 of this clutch impinge against the opposing dogs 51 of the proximate spur wheel 46 and effect through the co-acting gearing 45, 46 the rotation of the right-hand coiling spindle, while the left-hand spindle remains quiescent. The wire on the blade of the rotating spindle is bent or coiled in the groove of the proximate die 27 and is progressively advanced thereby into and across the netting field as above-described. As the coiling and feeding of the wire progresses the two worm wheels 75 are correspondingly rotated in the direction indicated by the arrows in Fig. 1. In the rotation of the left-hand worm wheel the pivoted dog 80 thereon encounters the lateral tooth 79 of the adjacent latch-bar 68 and forces the latter longitudinally inward until the latch-dog 70 engages the tooth 69 of said latch-bar, whereupon the pivoted dog 80 escapes the tooth 79 as above mentioned. In this movement of the left-hand latch-bar its lever arm 66 and the attached sliding collar 64 are shifted thereby, thus compressing the left-hand spring 62 between such sliding collar and the fixed frame or stop 63, such sliding collar thus being withdrawn a suitable distance from the opposing fixed collar 65 on the coupling rod. This action does not affect the position of the coupling rod as the right-hand sliding collar 64 is maintained fixedly in place through the action of the right-hand latch devices.

When a predetermined length of wire has been coiled and advanced by the right-hand spindle, the arm 77 of the right-hand worm-wheel encounters and trips the opposed latch-dog 70, thus unlocking the contiguous latch-bar 68 and releasing the sliding-collar 64 controlled thereby. The right-hand spring 62, expanding, forces this collar and, perforce, the coupling rod to the right, thus retracting the block 87 from the disk 86 of the left-hand spindle and unlocking the latter, and at the same time causing the right-hand block 87 to bear yieldingly against the face of the opposing disk. The two clutches are thus in neutral position—that is, both are out of action. By the same motion the relative position of the escapement pins 110 is changed and the fabric is raised a distance equal to half the width of a mesh; thereby correspondingly raising from the bottom of the trough 30 the immediately preceding strand (which has been previously cut) produced by the left-hand spindle.

The right-hand spindle, and its sleeve devices, continue to move about a half-turn on account of the momentum, but when the recess 89 of the disk on said sleeve reaches the block 87 the latter enters the recess and locks the said disk and its connections fixedly in place. The wire just formed and interlooped by the right-hand spindle is now standing in a vertical position, its bottom edge, or points, resting on the bottom of the trough 30 and the preceding meshes of the fabric being drawn up to their open intercrossing position.

At the same time that the block 87 enters the recess of the disk 86 the left-hand clutch is moved into action and the rotation of the worm shaft is reversed. Then follows the rotation of the left-hand spindle, which effects the spiralizing of the engaged wire and its advancement into and along the guide 30, said wire being progressively interlooped with the immediately preceding wire which is supported on the guide. In this operation the worm wheels rotate in the direction indicated by the arrows in Fig. 20. At a predetermined interval the pivoted dog 80 of the right-hand worm wheel 75 encounters the opposing lateral tooth 79 of the adjacent latch-bar 68 and shifts the latter to the left, thus compressing the right-hand spring 62 and bringing the tooth 69 of said bar into position for locking engagement by the right-hand latch-dog 70 as indicated in Fig. 20. At the same time this action takes place, and immediately upon the starting of the right-hand worm-wheel 75 in the return or left-hand direction, the stud 101 of said worm wheel encounters the projecting dog 102 of the right-hand cutter rack-bar and moves the same to the right against the action of the spring 99 thereby actuating the right-hand cutters and severing the wire (a, Fig. 19) which has just been produced by the right-hand spindle.

As previously indicated, this cutting action upon the right-hand strand takes place at the beginning of the weaving operation by the left-hand spindle and the coincident return or left-hand motion of the right-hand worm wheel. The left-hand spindle then continues to rotate and weave for the remainder of its predetermined number of meshes until the tappet arm 77 of the left-hand worm wheel strikes the opposing latch-dog 70, thereby releasing the left-hand spring 62 which shifts the coupling rod to the left. Both clutches are thus thrown to neutral position,—the block 87 of the left-hand clutch arm bearing against the face of the left-hand disk 86. By this action of the left-hand spring 62 and the shifting of the coupling rod 61, the controlling pins 110 are again shifted; the previously woven and severed right-hand strand (a, Fig. 19) is raised up a distance of one-half mesh, and the left-hand strand (b, Fig. 19) is brought to rest (by the stopping of the left-hand spindle) in a vertical position with its lower bends or points resting upon the bottom of the trough 30.

The left-hand spindle is locked in this position by the entrance of the block 87 into the recess of the left-hand disk 86. The right-hand spindle starts up and the strand just produced by the left-hand spindle is severed by the action of the left-hand cutters; the latter being timely actuated by the return movement of the left-hand worm wheel.

The above-described sequential operations of the coiling, cutting and take-up mechanisms are repeated until the prescribed length of fabric has been produced; and as one or the other coiling mechanism is in operation, irrespective of the periodical working of the cutters, it will be seen that my invention provides a machine of large capacity as compared with machines in which the coiling operation entirely ceases during the active period of the cutters.

In Fig. 19 are clearly shown the reversely-inclined ends of succeeding wires and the relative angular positions of the respective cutters whereby the latter are enabled to work in fixed paths and effect the proper angular severance of the wires.

I claim as my invention—

1. In a wire netting machine, the combination of oppositely-disposed wire-coiling mechanisms arranged in spaced relation to each other and including coiling blades in axial alinement with each other, and means for actuating said coiling mechanisms in alternation, whereby successive wires are coiled and fed in opposite directions to each other into and across the netting field, each wire being entered into the immediately preceding wire after the latter has been fully coiled and fed across said field.

2. In a wire netting machine, the combination of oppositely-disposed wire-coiling mechanisms arranged in spaced relation to each other and including coiling blades in axial alinement with each other, and means for actuating said coiling mechanisms in alternation whereby successive wires are coiled and fed in opposite directions into and across the netting field, each wire being entered into the immediately preceding wire after the latter has been fully coiled and fed across said field, and means coöperating with the respective coiling mechanisms for severing the coiled wires into predetermined lengths.

3. A wire netting machine having coiling and cutting mechanisms at each side of the netting field, and means for operating corresponding mechanisms in alternation, whereby the wires are projected in alternate succession across the netting field from opposite sides thereof and whereby each wire is severed after the partial engagement therewith of the next succeeding wire.

4. A wire netting machine having coiling and cutting mechanisms at each side of the netting field, said cutting mechanisms including cutting members arranged in reversely-inclined planes relatively to each other and at right angles to the opposing bends or inclinations of the wires to be severed.

5. A wire netting machine having coiling and cutting mechanisms at each side of the netting field, said cutting mechanisms including cutting members arranged in reversely-inclined planes relatively to each other and at right angles to the opposing bends or inclinations of the wires to be severed, means for actuating the respective coiling mechanisms in alternation, and means for periodically actuating the cutting mechanisms whereby wires are successively fed into the netting field from opposite sides of the latter and interlooped one with the other, and whereby one wire is severed after the engagement therewith of the next succeeding wire.

6. In a wire netting machine, the combination of a die, cutters, a support for said die and cutters, means for adjusting said support in respect to the netting field, means for actuating said cutters, including gear wheels and a reciprocative rack-bar therefor, said wheels being movable into and out of gear with the rack-bar, a coiling spindle having a blade extending into the die, means for periodically rotating said spindle, and means whereby the rack-bar is reciprocated at predetermined intervals.

7. In a wire netting machine, the combination of a die, cutters, a coiling spindle having a blade extending into the die, a support for said die, cutters and spindle, means for adjusting said support and its associated parts toward and from the netting field, means for actuating the cutters, means for periodically rotating the spindle, and means for temporarily locking the said spindle at the end of each period of its rotation.

8. In a wire netting machine, the combination of a die-support, a die thereon, cutters, a coiling spindle having a blade extending into the die, a head-stock supporting said die-support, cutters and spindle, means for adjusting said head-stock and its appurtenances toward and from the netting field, means for independently adjusting the die-support toward and from the cutters, means for periodically rotating the spindle, and means for actuating the cutters at predetermined intervals.

9. In a wire-netting machine, the combination of two oppositely-disposed wire coiling mechanisms, including coiling spindles, means, including clutch devices, for actuating said coiling mechanisms, said devices being so arranged that when either is active the other is idle, and means for operating said clutch devices.

10. In a wire-netting machine, the combination of two oppositely-disposed wire coiling mechanisms, including coiling spindles, means, including clutch devices, for actuating said coiling spindles, said devices being so arranged that when either is active the other is idle, means for operating said clutch devices, and locking and releasing means for said spindles.

11. In a wire netting machine, the combination with two oppositely-disposed wire-coiling mechanisms, including coiling spindles, means, including clutch devices, for actuating said coiling spindles, said devices being so arranged that when either is active the other is idle, means for operating said clutch devices, brake-wheels on said spindles, and co-acting brake elements therefor under the control of the clutch devices.

12. In a wire netting machine, the combination with two oppositely-disposed wire-coiling mechanisms, including coiling spindles, means, including clutch devices, for actuating said coiling spindles, said devices being so arranged that when either is active the other is idle, means for operating said clutch devices, brake wheels on said spindles having relatively arranged locking portions, and brake elements under the control of the clutch devices adapted to contact with the said wheels and to register with the said locking portions at predetermined intervals.

13. In a wire-netting machine, the combination with coiling and cutting mechanisms, of means, including a worm wheel, for determining the periods of rotation of the coiling mechanism, means, including rack and pinion devices, for actuating the cutting mechanism, and means whereby the said worm wheel co-acts with and impels the rack at the end of each period of rotation.

14. In a wire-netting machine, the combination with coiling and cutting mechanisms, and means for adjusting them toward and from the netting field, of means for determining the periods of rotation of the coiling mechanism, and means under the control of the last-named means for actuating the cutting mechanism irrespective of the adjusted positions of the latter.

15. In a wire-netting machine, the combination with right-hand coiling and cutting mechanisms, left-hand coiling and cutting mechanisms, and means for adjusting them toward and from each other, of means for determining the periods of rotation of the respective coiling mechanisms, and means, under the control of the last-named means, for periodically actuating the respective cutting mechanisms.

16. In a wire-netting machine, the combination with oppositely-disposed coiling spindles, means for periodically rotating the same in alternation, whereby when one spindle is active the other is idle, locking devices for the respective spindles, and means for alternately actuating said devices at predetermined intervals, whereby the idle spindle is locked and the active spindle is unlocked.

17. In a wire-netting machine, the combination with oppositely-disposed coiling spindles, means for adjusting said spindles toward or from each other, means for periodically rotating said spindles in alternation, whereby when one spindle is active the other is idle, locking devices for the respective spindles, and means for alternately actuating said devices at predetermined intervals, whereby the idle spindle is locked and the active spindle is unlocked.

18. In a wire-netting machine, the combination with oppositely-disposed coiling spindles, means for periodically rotating the same in alternation, whereby when one spindle is active the other is idle, locking devices for the said spindles, means for alternately actuating said devices at predetermined intervals, whereby the idle spindle is locked and the active spindle is unlocked, cutting mechanisms in advance of the respective spindles, and means for periodically actuating the respective cutting mechanisms.

19. In a wire-netting machine having coiling and cutting mechanisms, the combination with said mechanisms, of means for intermittently taking up the fabric section by section, two parallel rock-shafts, oppositely-extending arms on said shafts, reciprocative pins connected with said arms, and means for oscillating the shafts to move the pins in alternate succession into and from succeeding meshes of the fabric.

20. In a wire-netting machine having coiling and cutting mechanisms, the combination with said mechanisms, of means for intermittently taking up the fabric section by section, two parallel rock-shafts, means for adjusting the same toward or from each other, oppositely-extending arms on said shafts, reciprocative pins connected with said arms, and means for oscillating the shafts to move the pins in alternate succession into and from succeeding meshes of the fabric.

21. In a wire-netting machine having coiling and cutting mechanisms, the combination with said mechanisms, of means for intermittently taking up the fabric section by section, two parallel rock-shafts, oppositely-extending arms on said shafts, means for adjusting said arms longitudinally of the shafts, reciprocative pins connected with said arms and adjustable therewith, and means for oscillating the shafts to move the pins in alternate succession into and from succeeding meshes of the fabric.

22. In a wire-netting machine, the combination with oppositely-disposed coiling and cutting mechanisms and means for periodically operating the same, of a fabric escapement comprising pins movable into and from the web in alternate succession, and pin-actuating means under the control of the said operating means for the coiling and cutting mechanisms.

Signed at New York, in the county and State of New York this 5th day of February A. D. 1913.

HERBERT G. THOMSON.

Witnesses:
  E. LOWARFELDT,
  MAURICE BLOCH.

Copies of this patent may be obtained for five cents each, by addressing the "Commissioner of Patents, Washington, D. C."